US012244086B2

(12) United States Patent
Cabañero et al.

(10) Patent No.: US 12,244,086 B2
(45) Date of Patent: Mar. 4, 2025

(54) POLARIZED CONNECTOR FOR FLAT CABLE

(71) Applicant: Lear Corporation, Southfield, MI (US)

(72) Inventors: Albert M. Cabañero, Cebu (PH); Lewis Galligan, Novi, MI (US)

(73) Assignee: Lear Corporation, Southfield, MI (US)

( * ) Notice: Subject to any disclaimer, the term of this patent is extended or adjusted under 35 U.S.C. 154(b) by 294 days.

(21) Appl. No.: 17/553,864

(22) Filed: Dec. 17, 2021

(65) Prior Publication Data

US 2023/0198183 A1 Jun. 22, 2023

(51) Int. Cl.

*H01R 12/77* (2011.01)
*H01R 12/70* (2011.01)
*H01R 13/629* (2006.01)
*H01R 13/639* (2006.01)

(52) U.S. Cl.

CPC ....... *H01R 12/774* (2013.01); *H01R 12/7005* (2013.01); *H01R 13/629* (2013.01); *H01R 13/639* (2013.01)

(58) Field of Classification Search

CPC . H01R 12/774; H01R 12/7005; H01R 12/629
See application file for complete search history.

(56) References Cited

U.S. PATENT DOCUMENTS 2,935,725 A * 5/1960 Fox ...................... H01R 12/721 439/633
3,149,897 A * 9/1964 Martineck .............. H01R 12/78 439/495
3,696,319 A * 10/1972 Olsson ................... H01R 12/78 439/948
3,702,982 A * 11/1972 Kelly ..................... H01R 43/00 439/495
3,805,213 A * 4/1974 Austin ................... H05K 1/118 174/117 FF
4,477,137 A * 10/1984 Ayer ...................... H01R 12/88 439/495
4,509,811 A * 4/1985 Amano .................. H01R 12/79 439/495
4,629,271 A * 12/1986 Awano ................. H01R 12/592 439/495
4,630,874 A * 12/1986 Renn ...................... H01R 12/88 439/495
4,640,562 A * 2/1987 Shoemaker ............ H01R 12/79 439/495
4,948,378 A * 8/1990 Hoshino .............. H01R 12/714 439/495

(Continued)

*Primary Examiner* — Neil Abrams
(74) *Attorney, Agent, or Firm* — MacMillan, Sobanski & Todd, LLC

(57) ABSTRACT

An electrical connector includes a housing. The housing defines a terminal cavity that extends along a connector axis. The terminal cavity has a height that is perpendicular to the connector axis. The terminal cavity has a width that is perpendicular to the connector axis and also perpendicular to the height. The width is greater than the height. The terminal cavity adapted to accommodate a flat cable inserted in an insertion direction parallel to the connector axis. The electrical connector also includes a polarizer that extends parallel to the height. The polarizer is located within the width. The polarizer is adapted to prevent insertion into at least part of the terminal cavity.

19 Claims, 8 Drawing Sheets

(56) References Cited

U.S. PATENT DOCUMENTS

| | | | | | |
|---|---|---|---|---|---|
| 5,040,997 | A * | 8/1991 | Garner | H01R 12/78 | 439/329 |
| 5,194,017 | A * | 3/1993 | Consoli | H01R 12/79 | 439/495 |
| 5,236,366 | A * | 8/1993 | Deak | H01R 12/79 | 439/74 |
| 5,356,308 | A * | 10/1994 | Toba | H01R 13/5219 | 439/495 |
| 5,401,186 | A * | 3/1995 | Nozaki | H01R 13/11 | 439/495 |
| 5,403,202 | A * | 4/1995 | Roehling | H05K 1/118 | 439/496 |
| 5,562,487 | A * | 10/1996 | Li | H01R 12/79 | 439/495 |
| 5,934,932 | A * | 8/1999 | Ito | H01R 12/79 | 439/495 |
| 6,231,378 | B1 * | 5/2001 | Wu | H01R 12/592 | 439/495 |
| 6,379,176 | B1 * | 4/2002 | Ohsawa | H01R 12/79 | 439/495 |
| 6,386,905 | B1 * | 5/2002 | Ito | H01R 13/025 | 439/495 |
| 6,939,166 | B2 * | 9/2005 | Chung | H01R 12/79 | 439/573 |
| 7,048,573 | B2 * | 5/2006 | Masaki | H01R 12/89 | 439/492 |
| 7,121,874 | B1 * | 10/2006 | Jeon | H01R 12/774 | 439/495 |
| 7,399,192 | B2 * | 7/2008 | Yamamoto | H01R 12/79 | 439/495 |
| 2014/0295697 | A1 | 10/2014 | Nitsu et al. | | |
| 2016/0365677 | A1 | 12/2016 | Pulvermacher | | |
| 2016/0365678 | A1 | 12/2016 | Thackston | | |
| 2019/0165502 | A1 | 5/2019 | Hiroki et al. | | |
| 2020/0144752 | A1 | 5/2020 | Liao et al. | | |
| 2020/0234848 | A1 | 7/2020 | Chin | | |
| 2023/0198183 | A1 * | 6/2023 | Cabañero | H01R 12/7005 | 439/260 |

* cited by examiner

POLARIZED CONNECTOR FOR FLAT CABLE

BACKGROUND OF THE INVENTION

This invention relates to an electrical connector that is adapted for use with a flat flexible cable. More specifically, this invention relates to an electrical connector that is adapted to retain a flat flexible cable in a desired position relative to a connector housing.

A flat flexible cable is a type of electrical cable that includes a flat, flexible base that supports one or more flat electrical conductors thereon. Flat flexible cables are typically used in devices having a large amount of electronics in a relatively small space. In such devices, the flat flexible cable can provide for easier cable management than a conventional round electrical cable. It would be advantageous to have an improved electrical connector for attachment to a flat flexible cable.

SUMMARY OF THE INVENTION

The invention relates to an electrical connector. The electrical connector includes a housing. The housing defines a terminal cavity that extends along a connector axis. The terminal cavity has a height that is perpendicular to the connector axis. The terminal cavity has a width that is perpendicular to the connector axis and also perpendicular to the height. The width is greater than the height. The terminal cavity is adapted to accommodate a flat cable inserted in an insertion direction parallel to the connector axis. The electrical connector also includes a polarizer that extends parallel to the height. The polarizer is located within the width. The polarizer is adapted to prevent insertion into at least part of the terminal cavity.

In another embodiment, an electrical connector assembly includes an electrical terminal located in the terminal cavity. A flat cable extends into the terminal cavity. The flat cable includes a conductor. A cable lock is attached to the housing. The cable lock includes a lock tongue that extends into the terminal cavity. The flat cable is located at least partially between the electrical terminal and the lock tongue.

In another embodiment, an electrical connector assembly includes a housing defining a terminal cavity. The electrical connector also includes an electrical terminal that is adapted to be moved in an insertion direction into the terminal cavity. The electrical terminal includes a terminal tab that extends out of the terminal cavity and engages the housing to retain the electrical terminal in position relative to the housing. The electrical connector also includes a terminal lock that is adapted to be moved in the insertion direction relative to the housing into engagement with the housing to be retained in a lock position. When the terminal lock is in the lock position, it is located opposite the insertion direction from the terminal tab to retain the electrical terminal in the terminal cavity. The electrical connector includes a cable lock that is adapted to be moved in the insertion direction relative to the housing into engagement with the housing to be retained in a locked position. The cable lock includes a cable lock body. A cable lock opening extends through the cable lock body and is aligned in the insertion direction with the terminal cavity. A polarizer extends across part of the cable lock opening in a direction perpendicular to the insertion direction. A lock tongue extends from the cable lock body into the terminal cavity. The terminal lock is located between the housing and the cable lock body. Also, a flat cable extends through the cable lock opening into the terminal cavity. The flat cable includes a notch that extends in the insertion direction. The polarizer is located in the notch. The flat cable is located between the electrical terminal and the lock tongue.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
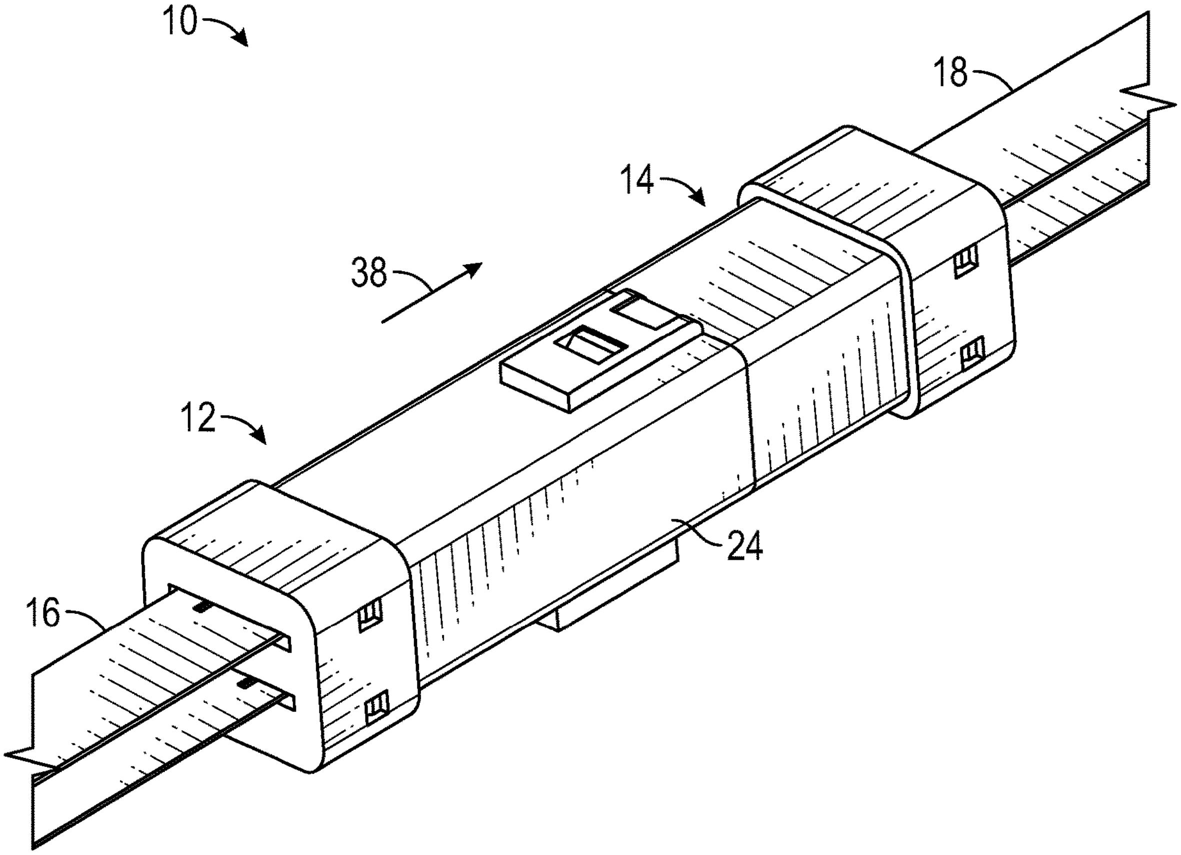
FIG. 1 is a perspective view of an electrical connector assembly including a first electrical connector and a second electrical connector.

Referring now to the drawings, there is illustrated in FIG. 1 an electrical connector assembly, indicated generally at 10. The electrical connector assembly 10 includes a first connector, indicated generally at 12, and a second connector, indicated generally at 14. In FIG. 1, the first connector 12 is shown mated with the second connector 14. The illustrated electrical connector assembly 10 is an inline connector assembly and is adapted to electrically connect a first cable 16 to a second cable 18. In the illustrated embodiment, there are two first cables 16 and two second cables 18. However, the electrical connector assembly 10 may connect any desired number of cables 16 and 18. Additionally, the electrical connector assembly 10 may be any desired type of connection and may be adapted to connect any desired conductors.

Figure 2:
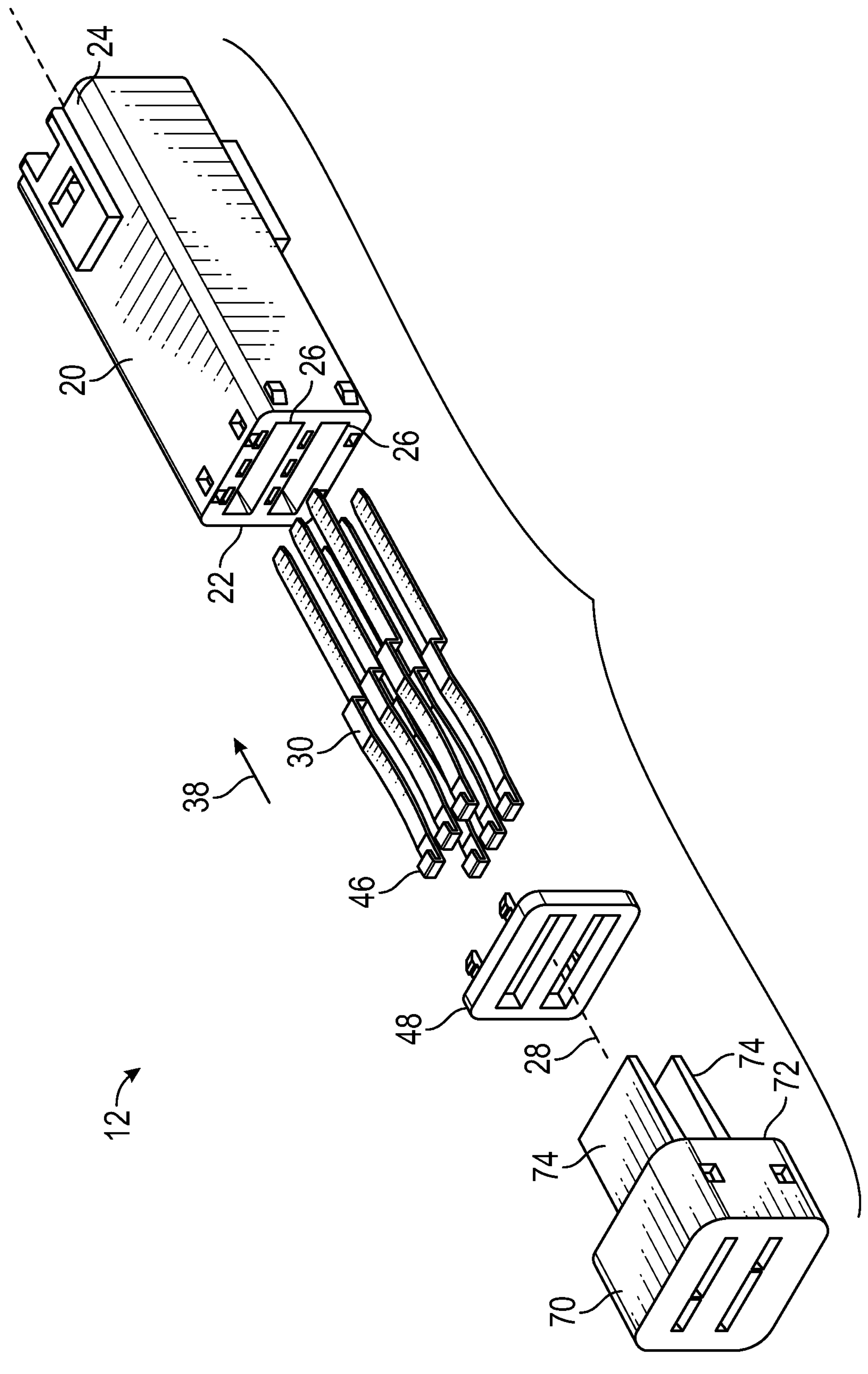
FIG. 2 is an exploded perspective view of the first electrical connector shown in FIG. 1.

Referring now to FIG. 2, there is illustrated an exploded perspective view of the first connector 12. The first connector 12 includes a housing 20. The illustrated housing 20 is molded from plastic, but may be made from any desired material and by any desired process. The housing 20 extends from an insert end 22 to a contact end 24. The insert end 22 is adapted to accommodate the first cables 16, as described below, and the contact end 24 is adapted to engage the second connector 14. The housing 20 of the first connector 12 includes two terminal cavity bays 26 that extend from the insert end 22 toward the contact end 24. The illustrated first connecter 12 includes two terminal cavity bays 26, but may include any desired number of terminal cavity bays 26. A connector axis 28 also extends from the insert end 22 toward the contact end 24.

The first connector 12 includes a plurality of first electrical terminals 30 that are adapted to be retained in the terminal cavity bays 26, as described below. The illustrated first connector 12 includes six of the first electrical terminals 30, but may include any desired number of first electrical terminals 30. The first electrical terminals 30 are described in detail below.

Figure 3:
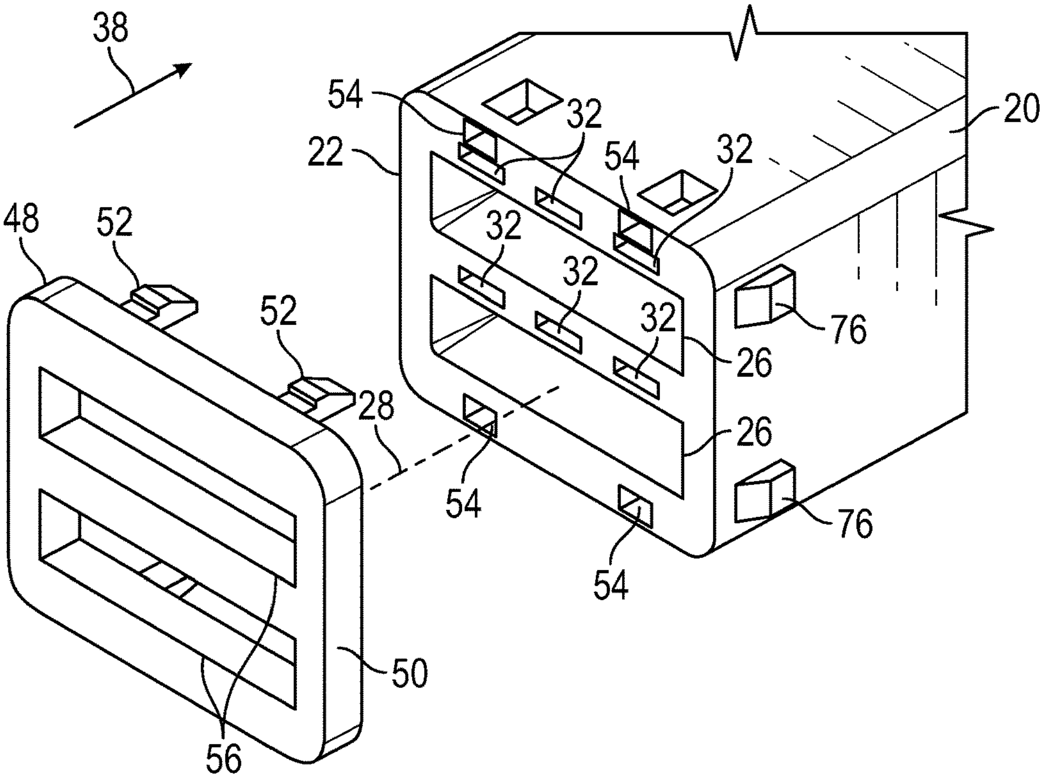
FIG. 3 is an enlarged perspective view of a portion of the first electrical connector shown in FIG. 2.
Figure 4:
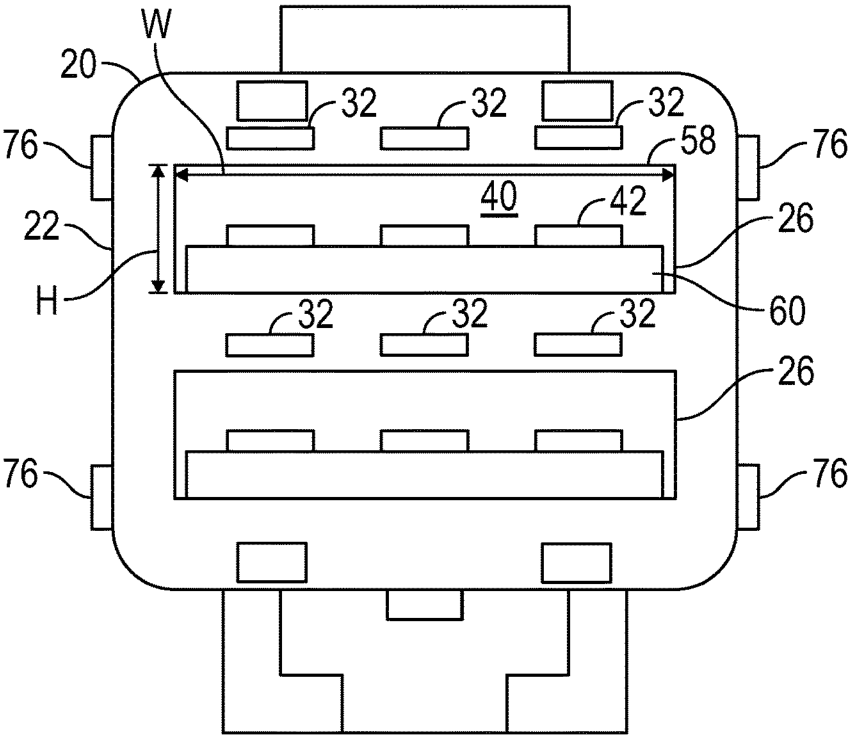
FIG. 4 is an end elevational view of a housing of the first electrical connector shown in FIG. 2.

FIG. 3 is an enlarged perspective view of the insert end 22 of the housing 20, and FIG. 4 is an end elevational view of the insert end 22. The housing 20 includes a plurality of terminal catches 32 in the insert end 22. Each of the illustrated terminal catches 32 is a recess that extends into the housing 20 and is parallel to the connector axis 28. The illustrated first connector 12 includes six terminal catches 32, but may include any desired number of terminal catches 32.

Figure 5:
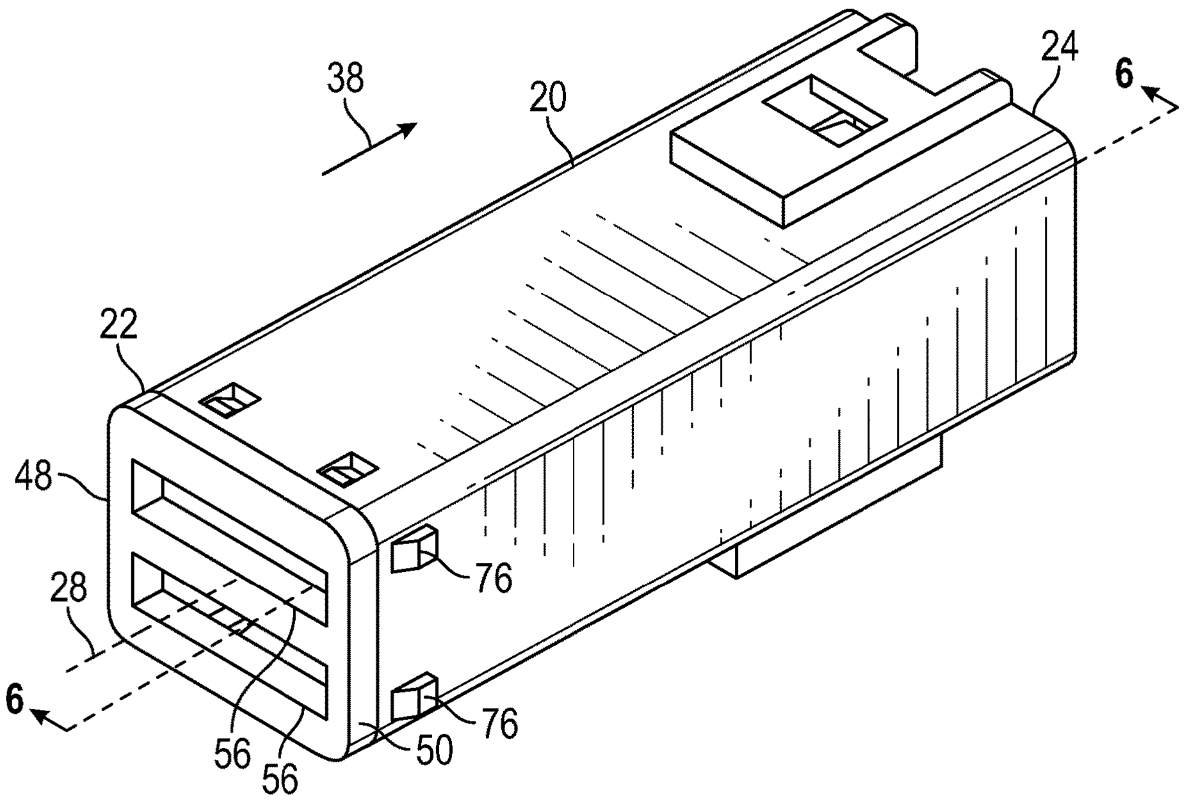
FIG. 5 is a perspective view showing the first electrical connector partially assembled.
Figure 6:
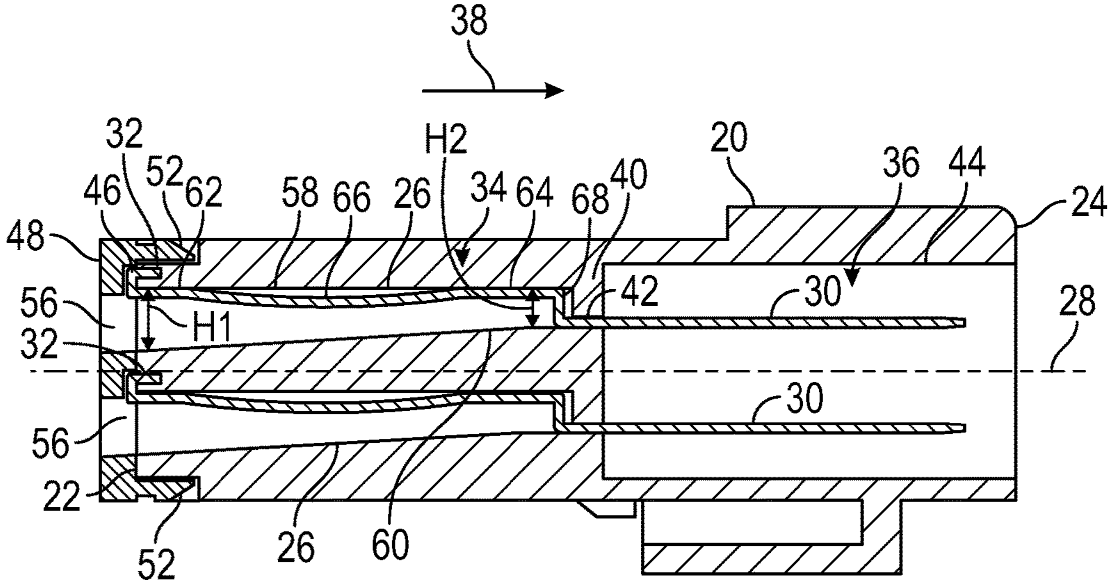
FIG. 6 is a cross-sectional view taken along line 6-6 of FIG. 5.

Referring now to FIG. 5, there is illustrated a perspective view of the first connector 12 shown partially assembled. FIG. 6 is a cross-sectional view taken along line 6-6 of FIG. 5. As shown, the first electrical terminals 30 are inserted into the housing 20. Each of the illustrated first electrical terminals 30 is the same, and only one will be described in detail.

The illustrated first electrical terminal 30 is made from sheet metal folded into the illustrated shape, but may be made from any material and any desired process. The first electrical terminal 30 includes a conductor portion, indicated generally at 34, that is adapted to engage the first cable 16, as described below, and a contact portion, indicated generally at 36, that is adapted to engage a second electrical terminal (not shown) that is located in the second connector 14. The illustrated contact portion 36 is a male blade, but may be any desired type of contact.

To install the first electrical terminal 30 in the first connector 12, the first electrical terminal 30 is initially positioned parallel to the connector axis 28, with the connect portion 36 facing the terminal cavity bay 26. The first electrical terminal 30 is then moved in an insertion direction 38 parallel to the connector axis 28 so that the first electrical terminal 30 is moved into the terminal cavity bay 26.

The terminal cavity bay 26 extends from the insert end 22 to a housing stop 40. As best shown in FIG. 4, the illustrated housing stop 40 is a wall that extends across the terminal cavity bay 26 perpendicular to the connector axis 28. The terminal cavity bay 26 includes a plurality of terminal openings 42 extending parallel to the connector axis 28 past the housing stop 40 and opening into a contact area 44 provided in the contact end 24 of the housing 20. The first electrical terminal 30 is moved in the insertion direction 38 so that the contact portion 36 extends through one of the terminal openings 42 and at least partially into the contact area 44. The terminal cavity bay 26 including the terminal opening 42 provides a terminal cavity adapted to accommodate the first electrical terminal 30. In the illustrated embodiment, the terminal cavity bay 26 includes three terminal openings 42 and defines three terminal cavities. However, the terminal cavity bay 26 may include any desired number of terminal openings 42 and may define any desired number of terminal cavities.

The first electrical terminal 30 includes a terminal tab 46 that is located on an end of the conductor portion 34 opposite the contact portion 36. The terminal tab 46 is a portion of the first electrical terminal 30 that extends in the insertion direction 38. When the first electrical terminal 30 is installed in the terminal cavity bay 26, the terminal tab 46 is received in one of the terminal catches 32. Each terminal catch 32 is adapted to receive a terminal tab 46 of one of the first electrical terminals 30 so as to retain the respective first electrical terminal 30 in place relative to the housing 20. The first electrical terminal 30 engages the housing 20 at the terminal catch 32 and at the housing stop 40 to limit movement of the first electrical terminal 30 relative to the housing 20. This limits movement of the first electrical terminal 30 relative to the housing 20 in the insertion direction 38 and also movement in any direction perpendicular to the connector axis 28.

The first connector 12 includes a terminal lock 48 that is adapted to retain the first electrical terminals 30 in their respective positions in the terminal cavity bays 26. The illustrated terminal lock 48 is molded from plastic, but may be made from any desired material using any desired process. The terminal lock 48 includes a terminal lock body 50. A plurality of terminal lock tabs 52 extend from the terminal lock body 50 in the insertion direction 38. The illustrated terminal lock 48 includes four terminal lock tabs 52, but may include any desired number of terminal lock tabs 52.

To attach the terminal lock 48 to the housing 20, the terminal lock 48 is initially positioned with the terminal lock tabs 52 facing the insert end 22. The housing 20 includes a plurality of terminal lock latches 54 in the insert end 22. The illustrated housing 20 includes four terminal lock latches 54, one for each terminal lock tab 52. The terminal lock 48 is then moved in the insertion direction 38 relative to the housing 20 so that each of the terminal lock tabs 52 engages one of the terminal lock latches 54. The terminal lock tabs 52 cooperate with the terminal lock latches 54 to retain the terminal lock 48 in the illustrated lock position relative to the housing 20. However, the first connector 12 may use any other desired lock to retain the terminal lock 48 in the lock position relative to the housing 20.

The terminal lock 48 includes terminal lock openings 56 that extend through the terminal lock body 50 parallel to the connector axis 28. The illustrated terminal lock 48 includes two terminal lock openings 56. When the terminal lock 48 is in the lock position, the terminal lock openings 56 are aligned with the terminal cavity bays 26 in the insertion direction 38.

Additionally, when the terminal lock 48 is in the lock position, the terminal lock 48 is located opposite the insertion direction 38 of a portion of the first electrical terminal 30. As best shown in FIG. 6, part of the terminal lock body 50 is located opposite the insertion direction 38 from the terminal tab 46. Thus, when the terminal lock 48 is in the lock position, it prevents the first electrical terminal 30 from being moved opposite the insertion direction 38 relative to the housing 20 and prevents the first electrical terminal 30 from being removed from the terminal cavity bay 26.

The terminal cavity bay 26 extends from the insert end 22 of the housing 20 to the housing stop 40. As previously described, the illustrated housing 20 includes two terminal cavity bays 26. As best shown in FIGS. 3 and 4, each terminal cavity bay 26 is adapted to accommodate multiple first electrical terminals 30. In the illustrated embodiment, each terminal cavity bay 26 can accommodate three of the first electrical terminals 30. However, the terminal cavity bays 26 can accommodate any desired number of first electrical terminals 30.

The two terminal cavity bays 26 are similar, and only one will be described in detail. Referring to FIG. 4, the terminal cavity bay 26 has a width W and a height H. FIG. 4 is a view taken perpendicular to the connector axis 28 and the width W is also perpendicular to the connector axis 28 while the height H is perpendicular to the connector axis 28 and perpendicular to the width W. In the illustrated embodiment, the width W of the terminal cavity bay 26 is greater than the height H in order to accommodate the first cable 16, as described below. However, the terminal cavity bay 26 may have any desired relative dimensions.

As best shown in FIG. 6, the terminal cavity bay 26 includes a first cavity wall 58 and a second cavity wall 60 that is on an opposite side of the terminal cavity bay 26 from the first cavity wall 58. The distance between the first cavity wall 58 and the second cavity wall 60 defines the height H of the terminal cavity bay 26. The first cavity wall 58 extends at an angle relative to the second cavity wall 60 so that the height H of the terminal cavity bay 26 changes between the insert end 22 the housing stop 40. A first height H1 at the insert end 22 is greater than a second height H2 near at the housing stop 40. In the illustrated embodiment, the first cavity wall 58 extends parallel to the connector axis 28 and the second cavity wall 60 extends at an angle to the connector axis 28. However, the first cavity wall 58 and the second cavity wall 60 may have any desired relative orientations.

As previously described, the conductor portion 34 of the first electrical terminal 30 is adapted to engage the first cable 16. The conductor portion 34 is located in the terminal cavity bay 26. The conductor portion 34 engages the first cavity wall 58 at both a first support 62 located near the insert end 22 and a second support 64 located near the housing stop 40. The conductor portion 34 includes a compression portion 66 between the first support 62 and the second support 64. The illustrated compression portion 66 is a part of the first electrical terminal 30 that is generally arcuate in shape and is spaced apart from the first cavity wall 58 between the first support 62 and the second support 64.

The first electrical terminal 30 includes a terminal stop 68 between the second support 64 and the contact portion 36. The illustrated terminal stop 68 is a portion of the first electrical terminal 30 that extends substantially perpendicular to the connector axis 28. The terminal stop 68 is located near the housing stop 40, but a space is provided between the housing stop 40 and the terminal stop 68 when the first electrical terminal 30 is installed in the terminal cavity bay 26, as shown in FIG. 6.

Figure 7:
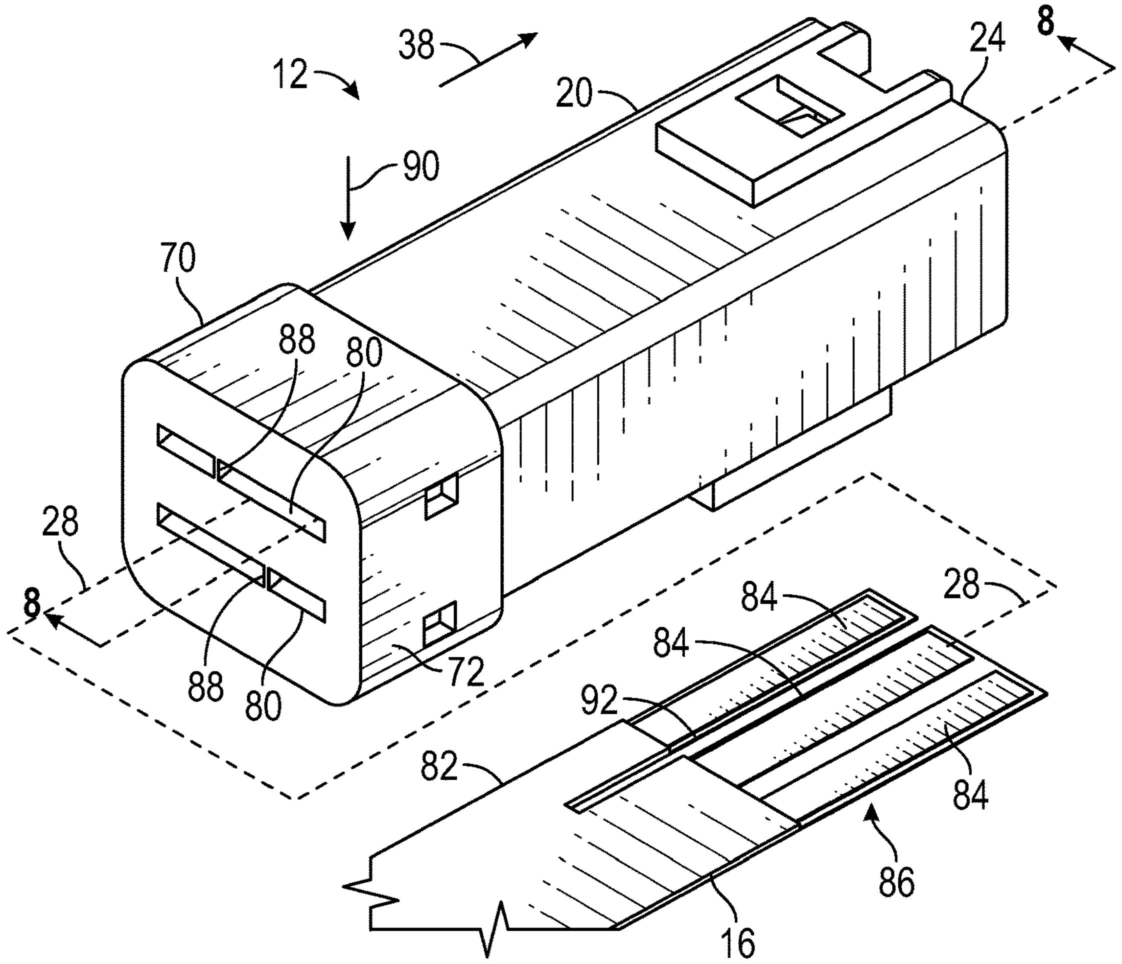
FIG. 7 is a perspective view similar to FIG. 5 showing the first electrical connector in a pre-load state.
Figure 8:
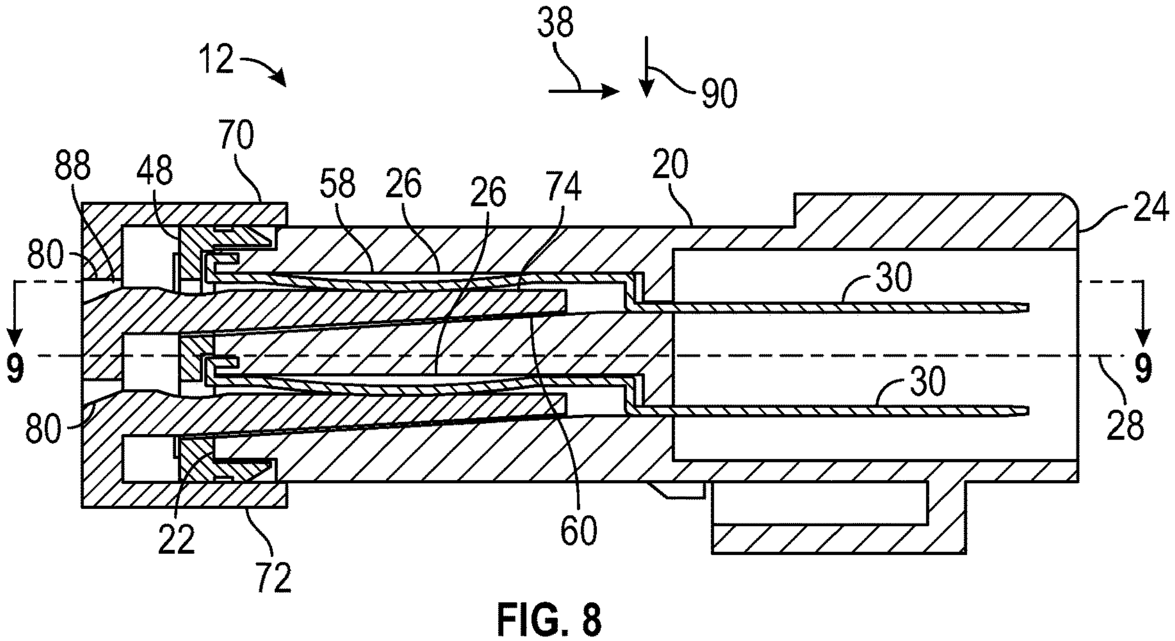
FIG. 8 is a cross-sectional view taken along line 8-8 of FIG. 7.

Referring now to FIG. 7, there is illustrated a view similar to FIG. 5 showing a cable lock 70 attached to the housing 20 in a pre-load position. FIG. 8 is a cross-sectional view taken along line 8-8 of FIG. 7. The cable lock 70 is adapted to hold the first cable 16 in place relative to the housing 20.

The illustrated cable lock 70 is molded from plastic, but may be made of any desired material and by any desired process. The cable lock 70 includes a cable lock body 72. A plurality of lock tongues 74 extends from the cable lock body 72 in the insertion direction 38. The illustrated cable lock 70 includes two lock tongues 74, but may include any desired number of lock tongues 74.

To attach the cable lock 70 to the housing 20, the cable lock 70 is initially positioned with the lock tongues 74 facing the insert end 22. The cable lock 70 is then moved in the insertion direction 38 relative to the housing 20 so that each of the lock tongue 74 passes through one of the terminal lock openings 56 and enters into one of the terminal cavity bays 26. Each of the lock tongues 74 extends between one of the first electrical terminals 30 and the respective second cavity wall 60.

Figure 9:
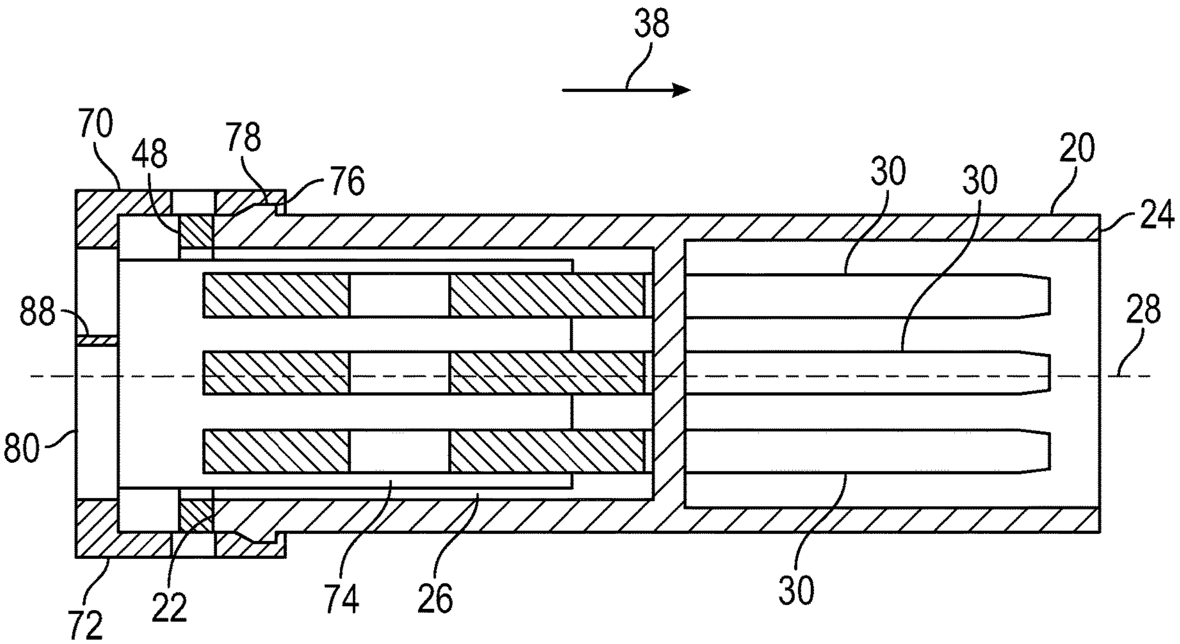
FIG. 9 is a cross-sectional view taken along line 9-9 of FIG. 8.

Referring back to FIG. 5, the housing 20 includes a plurality of cable lock tabs 76. The illustrated housing includes four cable lock tabs 76 (two are visible in FIG. 5), but may include any desired number of cable lock tabs 76. FIG. 9 is a cross-sectional view taken along line 9-9 of FIG. 8 and shows two of the cable lock tabs 76. The cable lock 70 includes a plurality of pre-load latches 78 that engages the cable lock tabs 76. The illustrated cable lock 70 includes four pre-load latches 78 (two are visible in FIG. 9), but may include any desired number of pre-load latches 78. When the cable lock 70 is moved in the insertion direction 38 relative to the housing 20 to the illustrated pre-load position, each of the pre-load latches 78 engages an associated one of the cable lock tabs 76 to limit movement of the cable lock 70 relative to the housing 20. The cable lock tabs 76 cooperate with the pre-load latches 78 to retain the cable lock 70 in the pre-load position relative to the housing 20.

The cable lock 70 includes cable lock openings 80 that extend through the cable lock body 72. When the cable lock 70 is in the pre-load position, the cable lock openings 80 are aligned with the terminal cavity bays 26 in the insertion direction 38 and provide access to the terminal cavity bays 26 through the cable lock body 72. The illustrated cable lock 70 includes two cable lock openings 80, but may include any desired number of cable lock openings 80.

Referring back to FIG. 7, there is also shown an enlarged view of a portion of the first cable 16. The first cable 16 is a flat flexible cable. The illustrated first cable 16 includes an insulator 82 that is formed from a plastic material, but any desired material may be used. The first cable 16 also includes an electrical conductor 84. The illustrated electrical conductor 84 is a relatively thin, solid layer of copper that is bonded to or otherwise supported on the insulator 82, but may be any desired material. The illustrated first cable 16 includes three electrical conductors 84, but may include any desired number of electrical conductors 84. The ratio of the height to the width of the electrical conductor 84 and the first cable 16 are significantly different from a typical round wire or a bundle of wires, which typically define an electrical conductor having a generally circular cross-section.

The insulator 82 surrounds the electrical conductors 84 along most of the length of the first cable 16. The first cable 16 includes a stripped portion, indicated generally at 86, where portions of the electrical conductors 84 are not covered by the insulator 82. The stripped portion 84 may be created by removing a portion of the insulator 82 that would otherwise cover the electrical conductors 84. Each of the electrical conductors 84 can be engaged with one of the first electrical terminals 30 by inserting the first cable 16 into the terminal cavity bay 26.

The first connector 12 includes a polarizer 88 that restricts the insertion of the first cable 16 into the terminal cavity bay 26. The illustrated polarizer 88 is located on the cable lock 70, but may be on any desired part of the first connector 12. The polarizer is a stop that extends across a portion of the cable lock opening 80. The illustrated polarizer 88 is a physical stop that limits the first cable 16 from being inserted into a portion of the terminal cavity bay 26 in the insertion direction 38. As best shown in FIG. 8, the illustrated polarizer 88 extends parallel to the height H. The illustrated polarizer 88 extends in a stop direction 90 that is the same direction as the direction between the first cavity wall 58 and the second cavity wall 60.

Referring back to FIG. 7, the first cable 16 includes a notch 92 in the stripped portion 86. The notch 92 extends through the complete thickness of the insulator 82. The illustrated notch 92 is located between two of the electrical conductors 84, but the notch 92 may be in any desired location on the first cable 16. The illustrated notch 92 extends parallel to the insertion direction 38.

Figure 10:
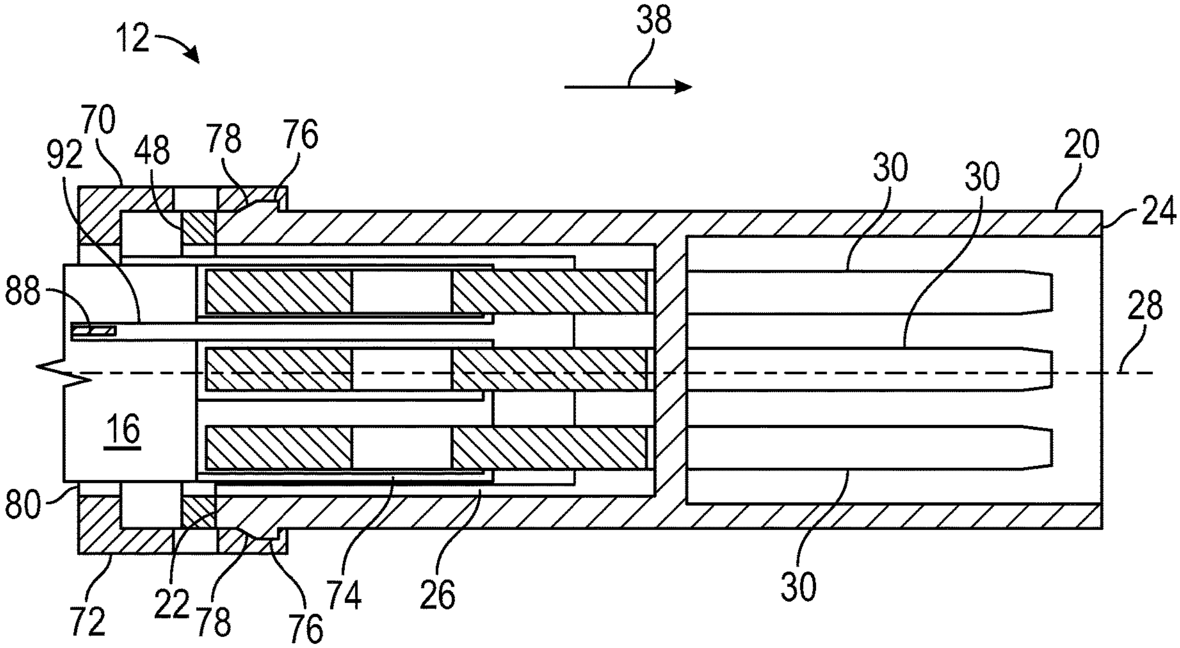
FIG. 10 is a cross-sectional view similar to FIG. 9 showing a first cable inserted into a terminal cavity of the first connector.

To insert the first cable 16 into the first connector 12, the first cable 16 is initially positioned with the stripped portion 86 adjacent to the insert end 22. The first cable 16 is then moved in the insertion direction 38 relative to the first connector 12 so that the first cable 16 passes through the cable lock opening 80. As previously described, the polarizer 88 is positioned in the cable lock opening 80 and, therefore, prevents the insertion of the first cable 16 into the terminal cavity bay 26 unless it is properly oriented relative to the polarizer 88. As shown in FIG. 10, when the first cable 16 is properly aligned and oriented with the first connector 12, the polarizer 88 is aligned in the insertion direction 38 with the notch 92 in the first cable 16. Thus, the first cable 16 can be moved in the insertion direction 38, through the cable lock opening 80 and the terminal lock opening 56, and into the terminal cavity bay 26. FIG. 10 shows the first cable 16 in a loaded position, where at least part of the stripped portion 86 is located adjacent to the compression portion 66 of the first electrical terminal 30. The first cable 16 is oriented with the insulator 82 facing the lock tongue 74 and with the electrical conductor 84 facing the first electrical terminal 30. Also, the polarizer 88 is located in the notch 92 in in the first cable 16.

As previously described, the illustrated first connector 12 includes two terminal cavity bays 26. Referring back to FIG. 7, the illustrated first connector 12 also includes two cable lock openings 80, each of which has one of the polarizers 88. The polarizer 88 in each of the cable lock openings 80 is in a different relative position, which prevents the first cables 16 form being inserted into the wrong terminal cavity bays 26. Each of the illustrated cable lock openings 80 includes a single polarizer 88, but the cable lock openings 80 may have multiple polarizers 88 if desired, and each may have a different number of polarizers 88.

Referring back to FIG. 10, the first connector 12 is shown with the first cable 16 in the loaded position and the cable lock 70 in the pre-load position. As previously described, the cable lock tabs 76 cooperate with the pre-load latches 78 to retain the cable lock 70 in the pre-load position relative to the housing 20. An operator may apply additional force to the cable lock 70 in order to release the pre-load latches 78 from the cable lock tabs 76 and move the cable lock 70 in the insertion direction 38 relative to the housing 20 to a locked position, shown in FIG. 11. The cable lock 70 includes a plurality of lock latches 94 that engage the cable lock tabs 76 to limit movement of the cable lock 70 relative to the housing 20. The illustrated cable lock 70 includes four lock latches 94 (two are visible in FIG. 11), but may include any desired number of lock latches 94. Each of the lock latches 94 is located opposite the insertion direction 38 from one of the pre-load latches 78 so that the pre-load latch 78 is released from one of the cable lock tabs 76 and the respective lock latch 94 engages that cable lock tab 76.

Figure 12:
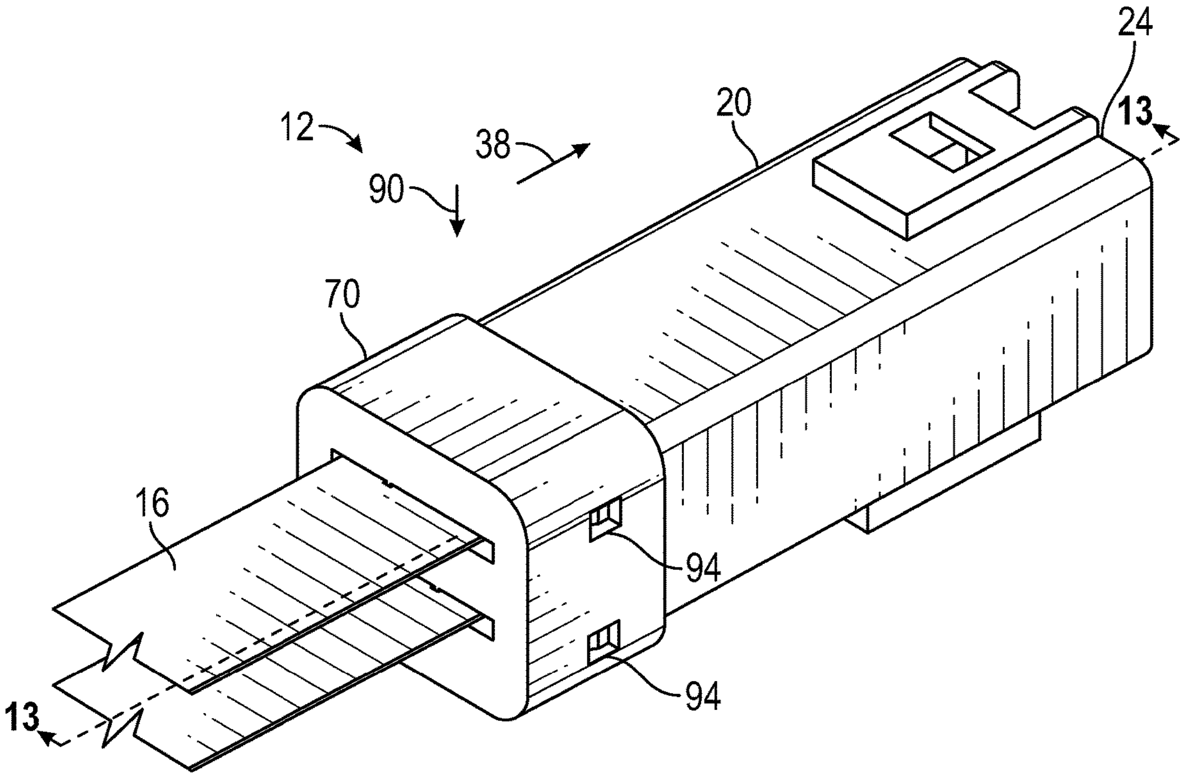
FIG. 12 is a perspective view similar to FIG. 7 showing the first electrical connector in a locked state.
Figure 13:
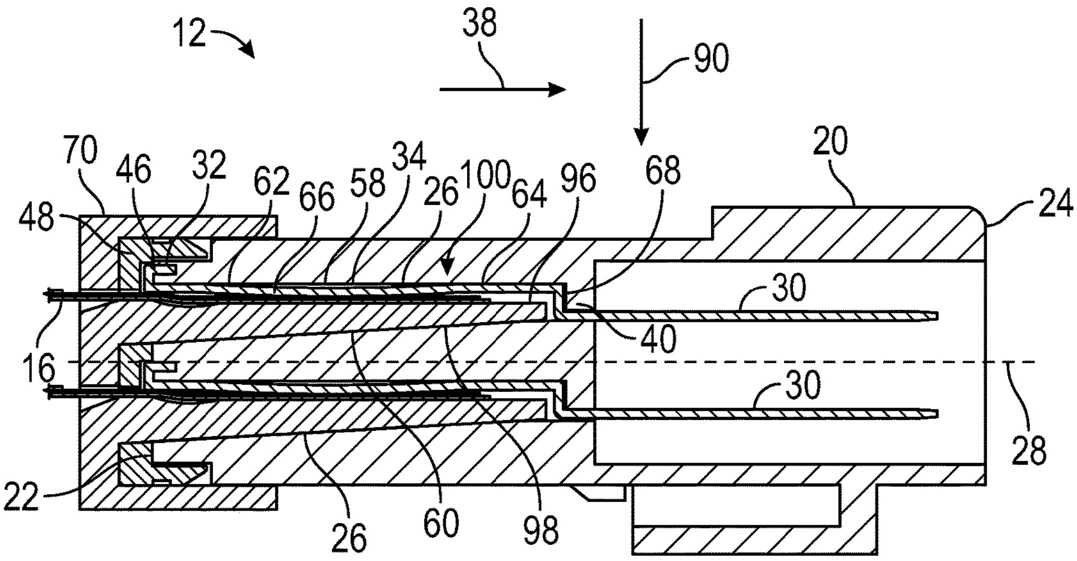
FIG. 13 is a cross-sectional view taken along line 13-13 of FIG. 12.

Referring to FIG. 12, there is illustrated a perspective view similar to FIG. 7, showing the first connector 12 with the cable lock 70 in the locked position. FIG. 13 is a cross-sectional view taken along line 13-13 of FIG. 12.

As previously described, the illustrated cable lock 70 includes two lock tongues 74. The two lock tongues 74 are the same, and only one will be described in detail. When the cable lock 70 is moved from the pre-load position to the locked position, the lock tongue 74 is moved in the insertion direction 38 relative to the housing 24. The lock tongue 74 is located between the first electrical terminal 30 and the second cavity wall 60. The lock tongue 74 includes a first tongue surface 96 that faces the first electrical terminal 30 and a second tongue surface 98 that faces the second cavity wall 60. The first tongue surface 96 extends at an angle relative to the second tongue surface 98, and the second tongue surface 98 is parallel to the second cavity wall 60. As a result, a first thickness of the lock tongue 74 between the first tongue surface 96 and the second tongue surface 98 is greater near the cable lock body 72 than a second thickness at an outer end of the lock tongue 74.

When the cable lock 70 is attached to the housing 24, there is a terminal space, indicated generally at 100, between the first cavity wall 58 and the first tongue surface 96. At least part of the conductor portion 34 is located in the terminal space 100. When the first cable 16 is in the loaded position, at least a part of the stripped portion 86 is located in the terminal space 100.

Figure 11:
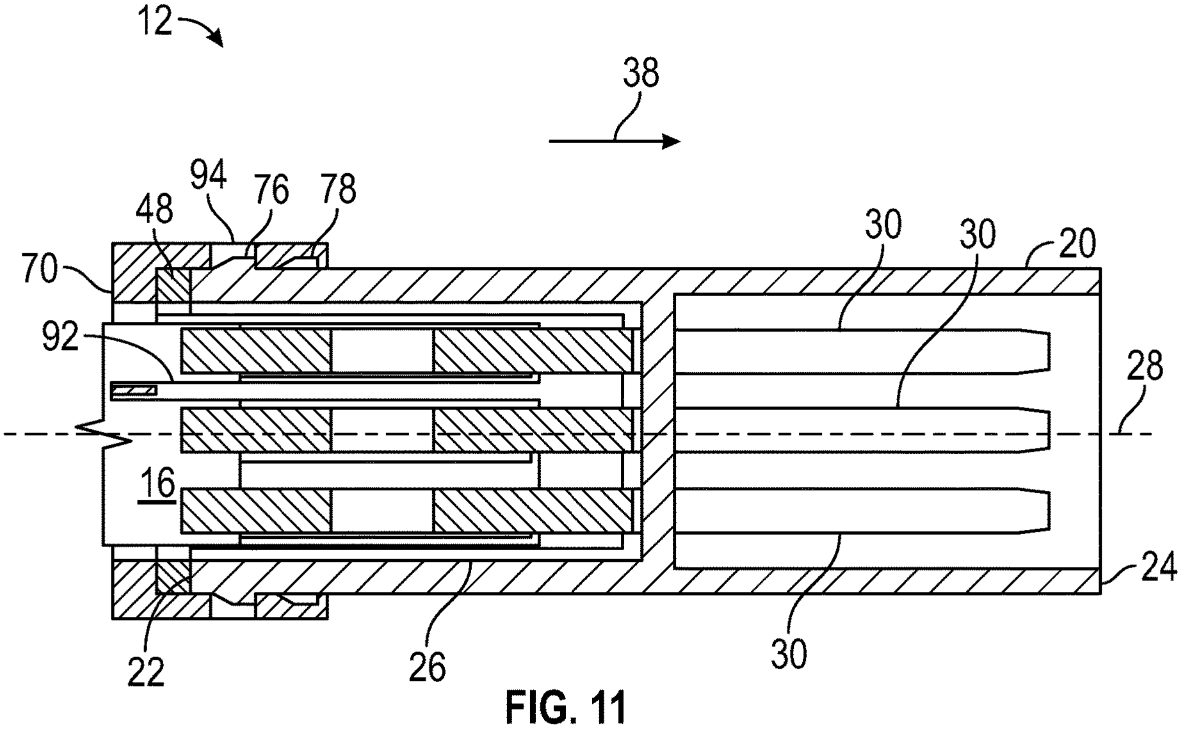
FIG. 11 is a cross-sectional view similar to FIG. 10 showing a cable lock on the first connector in a locked position.

When the cable lock 70 is moved from the pre-load position to the locked position, the second tongue surface 98 engages the second cavity wall 60 and is pushed toward the first cavity wall 58. This causes the first tongue surface 96 to also be moved toward the first cavity wall 58 and the terminal space 100 to become smaller. When the first tongue surface 96 is moved toward the first cavity wall 58, the first electrical cable 16 is pressed against a portion of the first electrical terminal 30. In particular, the electrical conductor 84 is pressed against the compression portion 66 of the conductor portion 34. This deflects the compression portion 66 toward the first cavity wall 58. The terminal tab 46 on the illustrated first electrical terminal 30 is held in the terminal catch 32 by the terminal lock 48 and is restrained from moving relative to the housing 24. However, the terminal stop 68 is able to move relative to the housing 24. Thus, when the compression portion 66 is deflected toward the first cavity wall 58, the terminal stop 68 is displaced in the insertion direction 38 toward the housing stop 40. When the cable lock 70 is retained in the locked position by the cooperation of the lock latches 94 and the cable lock tabs 76 (as shown in FIG. 11), the lock tongue 74 is retained pressing the electrical conductor 84 against the first electrical terminal 30 and deflecting the compression portion 66. This maintains a mechanical connection between the first connector 12 and the first cable 16, and also an electrical connection between the first electrical terminal 30 and the electrical conductor 84.

When the cable lock 70 is moved to the locked position, the lock tongue 74 is moved relative to the lock body 72 by the engagement of the second tongue surface 98 and the second cavity wall 60. As shown in FIG. 13, when the cable lock 70 is in the locked position a portion of the first cable 16 is pressed against the first support 62. This further maintains the mechanical connection between the first connector 12 and the first cable 16, and also the electrical connection between the first electrical terminal 30 and the electrical conductor 84.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An electrical connector, comprising:

a housing defining a terminal cavity that extends along a connector axis, the terminal cavity having a height perpendicular to the connector axis, and a width perpendicular to the connector axis and perpendicular to the height, wherein the width is greater than the height, and wherein the terminal cavity is adapted to accommodate a flat cable that is inserted in an insertion direction parallel to the connector axis;

an electrical terminal located in the terminal cavity, wherein the electrical terminal includes a terminal tab that extends out of the terminal cavity and adapted to engage the housing to retain the electrical terminal in position relative to the housing;

a cable lock that comprises a cable lock body and a lock tongue that extends from the cable lock body into the terminal cavity; and a polarizer that extends parallel to the height, is located within the width and on the cable lock, and the polarizer, on the basis of the location, is adapted to prevent insertion of the flat cable into at least part of the terminal cavity.

2. The electrical connector of claim 1, further including a terminal lock that is adapted to be moved in the insertion direction relative to the housing into engagement with the housing to be retained in a lock position, wherein the terminal lock retains the electrical terminal in the terminal cavity.

3. The electrical connector of claim 2, wherein the cable lock is further adapted to move in the insertion direction relative to the housing into engagement with the housing to be retained in a locked position, and wherein the terminal lock is located between the housing and the cable lock body.

4. The electrical connector of claim 3, wherein the cable lock further comprises a cable lock opening that extends through the cable lock body.

5. The electrical connector of claim 1, wherein the housing includes a plurality of terminal catches and each terminal catch of the plurality of terminal catches is adapted to receive the terminal tab to engage the housing to retain the electrical terminal in position relative to the housing.

6. The electrical connector of claim 5, wherein the terminal lock in the lock position is located opposite the insertion direction from the terminal tab.

7. The electrical connector of claim 2, further including the flat cable that is located at least partially in the terminal cavity, wherein the flat cable includes a notch that extends in the insertion direction, and wherein the polarizer is located in the notch in the flat cable.

8. The electrical connector of claim 7, wherein the electrical terminal is one of a plurality of electrical terminals and the flat cable includes a plurality of conductors, wherein each of the plurality of electrical terminals is in contact with at least one of the conductors, and wherein the notch is located between at least two of the plurality of conductors.

9. An electrical connector assembly, comprising:

a housing defining a terminal cavity;

an electrical terminal located in the terminal cavity, wherein the electrical terminal includes a terminal tab that extends out of the terminal cavity, and wherein the terminal tab engages the housing to retain the electrical terminal in position relative to the housing;

a flat cable extending into the terminal cavity and including a conductor; and a cable lock attached to the housing and including a lock tongue that extends into the terminal cavity, wherein the flat cable is located at least partially between the electrical terminal and the lock tongue.

10. The electrical connector assembly of claim 9, wherein the electrical terminal includes a compression portion, and wherein the lock tongue presses the flat cable against the electrical terminal so that the compression portion is deformed relative to the housing.

11. The electrical connector assembly of claim 9, wherein the terminal cavity includes a first cavity wall and an opposed second cavity wall, wherein the first cavity wall extends at an angle relative to the opposed second cavity wall so that a height of the terminal cavity is greater at the insert end than at an opposite end of the terminal cavity, and wherein the lock tongue is located between the electrical terminal and the second cavity wall.

12. The electrical connector assembly of claim 11, wherein the electrical terminal includes a first support that is engaged with the first cavity wall, a second support that is engaged with the first cavity wall, and wherein a compression portion is positioned between the first support and the second support and spaced apart from the first cavity wall.

13. The electrical connector assembly of claim 12, wherein the lock tongue presses the flat cable against the electrical terminal so that the compression portion is deformed relative to the housing.

14. The electrical connector assembly of claim 9, further including a terminal lock that is located between the cable lock and the housing, the terminal lock is engaged with the housing to retain the terminal lock in a lock position, wherein the terminal lock retains the electrical terminal in the terminal cavity.

15. The electrical connector assembly of claim 14, wherein the electrical terminal is adapted to be moved in an insertion direction relative to the housing into the terminal cavity, wherein the terminal lock is adapted to be moved in the insertion direction relative to the housing to the lock position, wherein the cable lock is adapted to be moved in the insertion direction relative to the housing to a locked position, and wherein the lock tongue is located in the terminal cavity.

16. The electrical connector assembly of claim 14, wherein the terminal lock in the lock position is located opposite the insertion direction from the terminal tab.

17. An electrical connector assembly, comprising:

a housing defining a terminal cavity;

an electrical terminal that is adapted to be moved in an insertion direction into the terminal cavity, and including a terminal tab that extends out of the terminal cavity and engages the housing to retain the electrical terminal in position relative to the housing;

a terminal lock that is adapted to be moved in the insertion direction relative to the housing into engagement with the housing to be retained in a lock position, wherein the terminal lock in the lock position is located opposite the insertion direction from the terminal tab to retain the electrical terminal in the terminal cavity;

a cable lock that is adapted to be moved in the insertion direction relative to the housing into engagement with the housing to be retained in a locked position, the cable lock including a cable lock body, a cable lock opening that extends through the cable lock body and is aligned in the insertion direction with the terminal cavity, a polarizer that extends across part of the cable lock opening in a direction perpendicular to the insertion direction, and a lock tongue that extends from the cable lock body into the terminal cavity, wherein the terminal lock is located between the housing and the cable lock body; and a flat cable that extends through the cable lock opening into the terminal cavity, the flat cable including a notch that extends in the insertion direction, wherein the polarizer is located in the notch, and wherein the flat cable is located between the electrical terminal and the lock tongue.

18. The electrical connector of claim 13, wherein the electrical terminal further includes a terminal stop, and wherein when the compression portion is deformed relative to the housing, the terminal stop is displaced in the insertion direction towards a housing stop.

19. The electrical connector of claim 18, wherein the housing stop is at least a portion that extends across the terminal cavity perpendicular to a connector axis.

* * * * *